United States Patent
Hallak et al.

(10) Patent No.: US 11,023,141 B2
(45) Date of Patent: Jun. 1, 2021

(54) RESILIENCY SCHEMES FOR DISTRIBUTED STORAGE SYSTEMS

(71) Applicant: Vast Data Ltd., Tel Aviv (IL)

(72) Inventors: Renen Hallak, Tenafly, NJ (US); Yogev Vaknin, Karkur (IL); Asaf Levy, Tel Aviv (IL); Lior Klipper, Tel Aviv (IL); Eli Malul, Tirat Hakarmel (IL)

(73) Assignee: Vast Data Ltd., Tel Aviv (IL)

( * ) Notice: Subject to any disclaimer, the term of this patent is extended or adjusted under 35 U.S.C. 154(b) by 0 days.

(21) Appl. No.: 16/295,610

(22) Filed: Mar. 7, 2019

(65) Prior Publication Data

US 2020/0285401 A1    Sep. 10, 2020

(51) Int. Cl.
*G06F 3/06* (2006.01)

(52) U.S. Cl.
CPC ............ *G06F 3/0619* (2013.01); *G06F 3/064* (2013.01); *G06F 3/067* (2013.01); *G06F 3/0655* (2013.01)

(58) Field of Classification Search
CPC ...... G06F 3/0619; G06F 3/064; G06F 3/0655; G06F 3/067
See application file for complete search history.

(56) References Cited

U.S. PATENT DOCUMENTS

| | | | | |
|---|---|---|---|---|
| 6,138,126 A * | 10/2000 | Hitz | ........................ | G06F 3/0613 |
| 8,560,772 B1 * | 10/2013 | Piszczek | ............... | G06F 3/0619 711/114 |
| 9,448,887 B1 * | 9/2016 | Ben Dayan | ............. | G06F 3/067 |
| 9,521,201 B2 * | 12/2016 | Oh | ......................... | G06F 3/0653 |
| 2011/0219259 A1 * | 9/2011 | Frost | ...................... | G06F 11/07 714/6.2 |
| 2014/0122795 A1 * | 5/2014 | Chambliss | .......... | G06F 11/2069 711/114 |
| 2015/0095554 A1 * | 4/2015 | Asnaashari | ......... | G06F 12/0246 711/103 |
| 2017/0149890 A1 | 5/2017 | Shamis et al. | | |
| 2017/0237560 A1 * | 8/2017 | Mueller | .................... | H04L 9/30 713/168 |
| 2018/0107383 A1 * | 4/2018 | Galbraith | .............. | G06F 3/0659 |
| 2019/0220213 A1 * | 7/2019 | Sun | ........................ | G06F 3/0619 |
| 2019/0391877 A1 * | 12/2019 | Stoica | .................... | G06F 3/0613 |

FOREIGN PATENT DOCUMENTS

WO    WO 2019239210    * 12/2018

* cited by examiner

*Primary Examiner* — Francisco A Grullon
(74) *Attorney, Agent, or Firm* — M&B IP Analysts, LLC

(57) ABSTRACT

A distributed storage system and a method for providing resiliency in distributed storage systems. The distributed storage system includes a plurality of storage nodes including a plurality of disks, wherein the plurality of disks includes a plurality of blocks, wherein the plurality of disks is logically segmented into the plurality of stripes, wherein each of the plurality of stripes is dynamically allocated to a portion of the plurality of blocks distributed across a subset of the plurality of disks; and a plurality of compute nodes, wherein each of the plurality of compute nodes is configured to read data from each of the plurality of storage nodes, wherein each of the plurality of compute nodes is assigned at least one stripe of the plurality of stripes, wherein each of the plurality of compute nodes is configured to write data to each stripe assigned to the compute node.

27 Claims, 5 Drawing Sheets

|  | Disk 1 | Disk 2 | Disk 3 | Disk 4 |
|---|---|---|---|---|
|  | 1 | 1 | 1 | 2 |
|  | 3 | 2 | 2 | 3 |
|  | 4 | 4 | 3 | 4 |
|  | 5 | 5 | 5 | 6 |
|  |  |  |  |  |
|  |  |  |  |  |

|  | Disk 1 | Disk 2 | Disk 3 | Disk 4 |
|---|---|---|---|---|
|  | 1 | 1 | 1 | 2 |
|  | 3 | 2 | 2 | 3 |
|  | 4 | 4 | 3 | 4 |
|  | 5 | 5 | 5 | 6 |
|  |  | 3 | 4 | 1 |
|  |  |  |  | 5 |

RESILIENCY SCHEMES FOR DISTRIBUTED STORAGE SYSTEMS

TECHNICAL FIELD

The present disclosure relates generally to resiliency in storage systems, and more particularly to resiliency schemes for distributed storage systems.

BACKGROUND

Redundant Array of Independent Disks (RAID) is a data storage virtualization technology that treats multiple physical disks as one or more logical units. RAID schemes help to provide data redundancy, improved storage performance, or both.

Several variants of RAID schemes exist, and each variant provides different advantages. The different schemes involve different distributions for data across multiple drives such that, for example, data can be read from multiple drives at once, redundant portions of drives may be used to restore data of failed drives, and the like. For example, different raid schemes may involve striping, mirroring, parity, or a combination thereof. RAID schemes may further be nested (also known as "hybrid RAID") so as to have different levels of RAID schemes. For example, RAID 0+1 includes creating stripes and mirroring the stripes.

Existing RAID schemes are typically implemented locally by a central processing unit (CPU) connected to storage drives. Such RAID schemes may be implemented using specialized hardware or using operating system drivers.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a distributed storage system. The distributed storage system comprises: a plurality of storage nodes including a plurality of disks, wherein the plurality of disks includes a plurality of blocks, wherein the plurality of disks is logically segmented into the plurality of stripes, wherein each of the plurality of stripes is dynamically allocated to a portion of the plurality of blocks distributed across a subset of the plurality of disks; and a plurality of compute nodes, wherein each of the plurality of compute nodes is configured to read data from each of the plurality of storage nodes, wherein each of the plurality of compute nodes is assigned at least one stripe of the plurality of stripes, wherein each of the plurality of compute nodes is configured to write data to each stripe assigned to the compute node.

Certain embodiments disclosed herein also include a method for providing resiliency in distributed storage systems. The method comprises: allocating, by a first compute node of a plurality of compute nodes, at least one first stripe of a plurality of stripes, wherein the plurality of stripes is distributed among a plurality of storage nodes including a plurality of disks, wherein the plurality of disks includes a plurality of blocks, wherein the plurality of disks is logically segmented into the plurality of stripes, wherein each of the plurality of stripes is dynamically allocated to a portion of the plurality of blocks distributed across a subset of the plurality of disks, wherein each of the plurality of compute nodes is configured to read data from each of the plurality of storage nodes, wherein the first compute node is assigned to the at least one first stripe, wherein the first compute node is configured to write data to the at least one first stripe.

Certain embodiments disclosed herein also include a non-transitory computer readable medium having stored thereon instructions for causing a processing circuitry to execute a process, the process comprising: allocating at least one first stripe of a plurality of stripes, wherein the plurality of stripes is distributed among a plurality of storage nodes including a plurality of disks, wherein the plurality of disks includes a plurality of blocks, wherein the plurality of disks is logically segmented into the plurality of stripes, wherein each of the plurality of stripes is dynamically allocated to a portion of the plurality of blocks distributed across a subset of the plurality of disks, wherein each of a plurality of compute nodes is configured to read data from each of the plurality of storage nodes, wherein each of the plurality of compute nodes is assigned at least one stripe of the plurality of stripes, wherein each of the plurality of compute nodes is configured to write data to each stripe assigned to the compute node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 3A-3B are example tables illustrating disk allocation before and after a failure of a disk.

DETAILED DESCRIPTION

Figure 1:
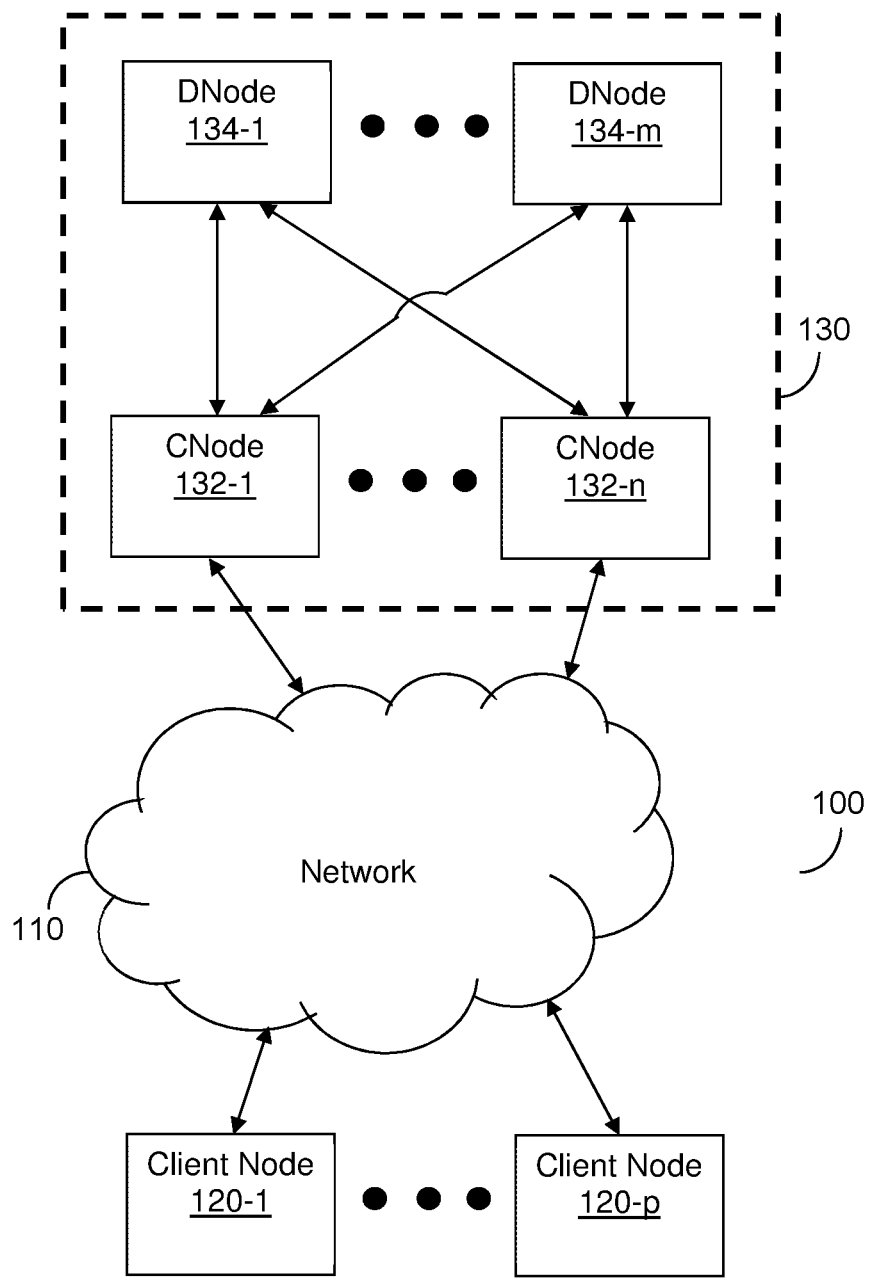
FIG. 1 is a network diagram illustrating a distributed storage system utilized according to various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments provide resiliency schemes for use in distributed storage systems. The disclosed embodiments may be applied to a distributed storage system for use with, for example, Redundant Array of Independent Disk (RAID) schemes. Thus, the disclosed embodiments allow for RAID operations with respect to drives that are remote from a CPU. The disclosed embodiments may be applied to distributed storage systems in which multiple compute nodes may each have access to multiple storage nodes. The compute nodes may be remote from each other, from the storage nodes, or both. Likewise, the storage nodes may be remote from each other. Further, the disclosed embodiments provide techniques for improving performance of such resiliency schemes.

In an embodiment, stripes are distributed across a distributed storage system. The distributed storage system includes multiple storage nodes, with each storage node including one or more disks. Each stripe is distributed among a respective subset of the storage nodes and includes erase blocks distributed among its respective subset of storage nodes. More specifically, each stripe is distributed among disks in the storage nodes. Compute nodes of the distributed storage system may be configured to access the storage nodes such that each compute node may access data in each of the storage nodes and each compute node may modify data in an assigned portion of the storage nodes.

The disclosed embodiments also provide techniques for assigning stripes dynamically. This dynamic allocation of stripes allows for faster reads and writes as well as reduced lock contention. In particular, distributing stripes among a subset of disks allows for minimizing hotspots where many operations are being performed on the same portion of the distributed storage system around the same time. The subset of disks for each stripe may be allocated using various constraints that further improve overall performance of the distributed storage system. Further, the disclosed embodiments allow for asymmetrical distribution of data among stripes to allow for use of disks of different storage sizes. The dynamic assignment of stripes as well as specific constraints on assignment of stripes both contribute to ensuring high availability of the distributed storage system in the event of disk failures.

FIG. 1 is an example network diagram 100 illustrating a distributed storage system utilized according to various disclosed embodiments. The network diagram 100 includes a distributed storage system 130, a network 110, and client nodes 120-1 through 120-p (referred to as a client node 120 or as client nodes 120 for simplicity).

The distributed storage system 130 includes compute nodes (CNodes) 132-1 through 132-n (referred to as a CNode 132 or as CNodes 132 for simplicity) and storage nodes (DNodes) 134-1 through 134-m (referred to as a DNode 134 or as DNodes 134 for simplicity). In an example implementation, the distributed storage system 130 may be configured as described further in U.S. patent application Ser. No. 16/002,676, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DNodes 134 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof. Each DNode 134 includes one or more drives containing disks such that each DNode 134 includes one or more disks (drives and disks not shown in FIG. 1). Further, 2 drives on the same DNode 134 may be considered one quad for organizational purposes.

Figure 2:
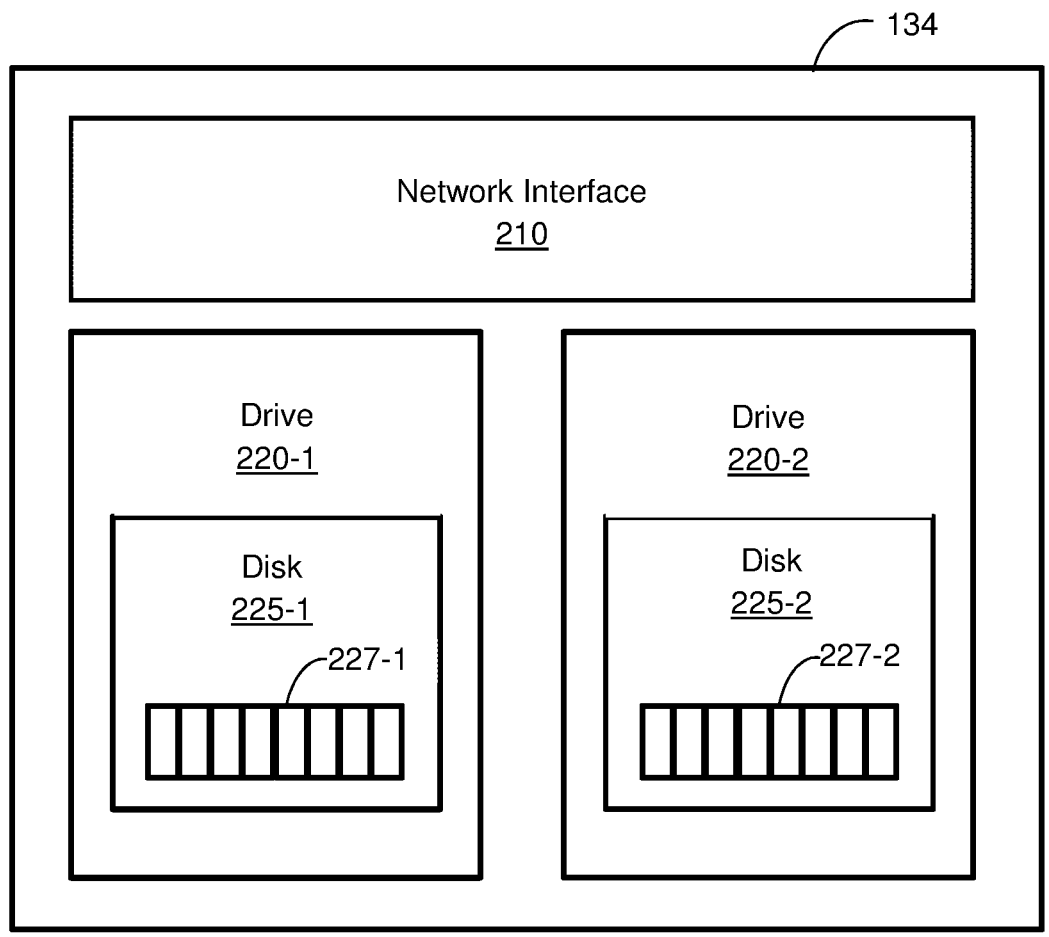
FIG. 2 is a schematic diagram of a storage node according to an embodiment.

In an embodiment, each DNode 134 includes two drives, where each drive includes a disk. FIG. 2 is an example schematic diagram showing a DNode 134 according to this embodiment. In the schematic diagram shown in FIG. 2, the DNode 134 includes a network interface 210 and two drives 220-1 and 220-2. The network interface 210 allows the DNode 134 to communicate with, for example, the CNodes 132, for the purposes of storing data, retrieving stored data, and the like.

Each drive 220 is a data storage unit including a memory component. In the example schematic diagram shown in FIG. 2, the memory component in each drive 220 is a disk 225-1 or 225-2. Each drive 220 at least includes electrical components used to write data to and read data from its respective disk 225. Each disk 225 includes data blocks 227. The data blocks 227 include data stored by the CNodes 132 and metadata (e.g., the element store as described herein).

It should be noted that the particular configuration shown in FIG. 2 is merely an example and does not necessarily limit any of the disclosed embodiments. Different numbers of drives and disks may be included in each DNode 134 without departing from the scope of the disclosure. Further, the disks may be any discrete physical or logical memory components to which data can be stored and from which data can be read. At least some of the disclosed embodiments may be equally applicable to non-disk memory components such as, but not limited to, solid state drives.

The CNodes 132 are configured to translate access commands into formats supported by the DNodes 134. Example protocols supported via translation by the CNodes 132 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. Because the CNodes 132 are configured to translate access commands into a format that is supported by the protocol of the DNodes 134, support for new protocols may be added by configuring the CNodes 132 with translation rules for the new protocols. The translation rules may include rules for converting access commands in a received format into a format that is compatible with the protocol supported by the DNodes 134.

The CNodes 132 collectively act as a distributed transaction manager for accessing data in the DNodes 134. As the CNodes 132 do not store the data to be accessed by client nodes or the metadata used for navigating to locations in the DNodes 134, such data and metadata do not need to be recovered when one or more of the CNodes 132 fails. Additionally, CNodes 132 may be added or removed without disrupting data stored in the storage system 130. An example schematic diagram of a CNode 132 is described below with respect to FIG. 5.

The client node 120 is configured to send access commands to the distributed storage system 130 via the network 110. The CNodes 132 are configured to receive access commands from the client nodes 120 and to access the DNodes 134 based on the received commands. The access may include translating the received commands into a format supported by the DNodes 134. As shown in FIG. 1, each CNode 132 may access all DNodes 134. As a non-limiting example, NVM Express (NVMe) over Fabrics may be utilized to enable such access.

The access may include navigating metadata stored in the DNodes 134 to access data in data blocks stored in the DNodes 134. The CNodes 132 are configured to navigate the element trees to read the data blocks and to modify the element trees by, for example, splitting blocks, merging blocks, and the like. To this end, the CNodes 132 may be configured to allocate new blocks, write data to blocks, read data from blocks, add and remove pointers in blocks, and the like.

In an embodiment, data in the DNodes 134 is organized into stripes (not shown in FIG. 1) of segmented sequential data such that data in each stripe is distributed across two or more drives of the DNodes 134. To this end, each stripe includes data segments such as sub-stripes. In a further embodiment, each stripe is distributed across a subset of the disks of the DNodes 134. The distributions of stripes may be random or non-random (e.g., based on a predetermined distribution).

Random distributions of stripes may be between failure domains or within a failure domain. In an embodiment, each stripe may be distributed such that it does not include too much data from the same failure domain. To this end, in such an embodiment, each stripe may be distributed across a subset of disks that includes at most an allowed number of disks from the same failure domain. The allowed number of disks may be preconfigured (i.e., a predetermined number that each CNode 132 is configured with) or may be dynamically determined by the CNodes 132 as the distributed storage system 130 changes. To this end, the number of disks in the subset of disks for each stripe is distributed (i.e., the width of each stripe) may be changed based on the number of drives in the distributed storage system 130, the amount of free space available in the DNodes 134, the number of failure domains that are currently available, or a combination thereof. Each failure domain includes one or more disks and represents a portion of the distributed storage system 130 that is negatively affected by failure of one or more of its disks. In example implementations, a failure domain may be, but is not limited to, a carrier (not shown) including one or more drives, a storage box (not shown) including one or more of the DNodes 134, and the like. Limiting each stripe to an allowed number of disks within the same failure domain minimizes affects of failures on performance with respect to the stripes.

In an example implementation, the distributions of stripes across disks may be based on a weighted round robin block selection. The values for the weights may be set based on remaining lifespan (e.g., based on number of write cycles remaining), based on amount of free space on each DNode 134, based on amount of space needed for recovery (e.g., 1% of total storage space), based on total sizes of the stripes, or a combination thereof. For example, blocks in disks that have a higher number of write cycles remaining, that have more free space, that have the largest size, or a combination thereof, may be prioritized when selecting blocks to which stripes should be allocated.

The values used for determining weights based on free space may further be based on proportional free space of each disk, i.e., a proportion of the disk that is free rather than simply the total amount of free space. This provides more optimal selection when disks of different sizes are used.

Additional constraints may be placed on the weighted round robin block selection. One constraint may be that stripes are allocated such that blocks of the same disk are not used for different portions of a stripe. Another constraint may be that the stripe size is limited based on the total number of disks and a desired number of failed disks or DNodes 134 that are allowed to occur at a time before data cannot be recovered. In an example implementation, blocks that meet the highest number of constraints may be selected so as to minimize problems during recovery (e.g., being unable to write recovered data from the same stripe to different disks when multiple disks have failed. The weights may further be assigned such that the number of disks in the same failure domain storing blocks of a stripe does not exceed a threshold.

As a non-limiting example for constraints, if there are 25 DNodes and each DNode includes two disks, the stripe size cannot exceed 50 blocks (i.e., one block for each of the 50 disks included in the DNodes 134). As another non-limiting example, if 4 failed DNodes are to be supported in the previous example, the stripe size must be at least 42 blocks (i.e., 2 disks per DNode times 4 failed DNodes).

FIGS. 3A-B illustrate example tables 300A and 300B, respectively, showing the effects of placing a constraint such that blocks of the same disk are not used for the same stripe before and after failure of a disk. In the example table 300A, entries 310-1 through 310-16 in the table represent blocks in the respective disks shown. Each entry 310 includes a number between 1 and 6, with the number representing which stripe that block is assigned to. For example, as shown in FIG. 3A, entry 310-1 represents a block in disk 1 assigned to stripe 1, entry 310-4 represents a block in disk 4 assigned to stripe 2, and entry 310-16 represents a block in disk 4 assigned to stripe 6.

As shown in FIGS. 3A-B, each stripe is assigned blocks among the disks such that no stripe is assigned to two or more blocks in the same disk. In the event of a failure of disk 1, the portions of the stripes assigned to blocks in disk 1 must be reallocated when rebuilding. As shown in FIG. 3B, in an example implementation, the stripes may be reallocated to the blocks represented by entries 310-17 through 310-20. The resulting allocation still meets the constraint that no stripe is assigned to two or more blocks on the same disk.

In an example implementation, 150 disks included in 75 DNodes may be used. This number of disks provides large stripes that minimizes the overhead for parity while also minimizing penalties during degraded read. In such an example, 4 of the 150 disks may be used for parity. This configuration has been identified as providing around 2.7% overhead with at most 30% degradation.

In an embodiment, at least a portion of the data in each stripe may include parity. Data in different disks may be used for parity such that the same disk is not always used for parity. To this end, role allocation for disks (e.g., whether a disk is used for parity or other roles) may be assigned using a pseudo-random function, for example based on a pseudo-random hash and the number of disks among the DNodes 134.

In an embodiment, rebuilding can occur at every storage location in the DNodes 134. Thus, instead of requiring rewriting parity, data in the DNodes 134 may return to the same redundancy level after a rebuild operation since the parity data is recovered during such rebuild. Additionally, because stripes may change during runtime of the CNodes 132, stripes may be rebuilt to make use of free space. To this end, each CNodes 132 may be configured to determine an unallocated portion of data in one of the DNodes 134 that is not part of the stripe and to rebuild the stripe in the determined unallocated portion (i.e., such that a portion of the rebuild stripe includes the determined unallocated portion) when one or more blocks to which the stripe is allocated is unavailable.

Each stripe has a height and a width. The height of the stripe is the total amount of data stored in a disk including the stripe (e.g., 100 megabytes) and the width is the number of disks over which the stripe is distributed (for example, for a 220+10 scheme, the stripe would have a width of 230). In an embodiment, each stripe includes a set of erase blocks spread across a subset of the disks of the DNodes 134. Each erase block is a portion of data that is the smallest unit of data that can be erased in the DNodes 134. In a non-limiting example implementation, each erase block is between 20 and 800 megabytes in size. The portions of the stripes used for redundancy may be distributed evenly among disks to avoid hotspots.

In an embodiment, each stripe may not be distributed across disks of all of the DNodes 134 and, instead, is distributed only across disks of a subset of the DNodes 134. This allows at least for better performance during recoveries due to fewer bottlenecks (e.g., when rebuild operations are performed). Additionally, stripes being distributed across subsets of the DNodes 134 allows for more flexible dynamic arrangements of stripes across the DNodes 134 over time as DNodes 134 are added or removed. Further, this distribution of stripes accommodates disks of different storage sizes in the DNodes 134 since the same amount of data does not need to be stored in each disk. Specifically, disks that have more free space may include portions of a higher number of stripes than disks with less free space. Moreover, when one of the disks in the DNodes 134 fails or is removed, new stripes may be distributed such that they do not include data in the disk of the failed or removed disk.

In an embodiment, the CNodes 132 are configured to perform at least foreground operations and background operations. The foreground operations include operations such as reads and degraded reads. In a further embodiment, each of the CNodes 132 may be configured to perform foreground operations on any of the DNodes 134 and, more specifically, on all portions of the DNodes 134.

The degraded reads may occur in response to a read error. In response to a read error, a CNode 132 may attempt to retry the read, report the error, and re-read the data using other disks (i.e., other than the disk that the CNode 132 is attempting to read). The read may be retried, for example, until a predetermined period of time has passed, at which time the data is read from the other disks. In an optional implementation, upon the first failure, the disk that the CNode 132 attempted to read may be reset. Otherwise, the disk may be marked as broken and all CNodes 132 may be instructed to reallocate blocks accordingly.

The background operations include operations such as writes and rebuilds. In a further embodiment, each of the CNodes 132 may be configured to perform background operations only on a specific subset of data stored in the DNodes 134. Specifically, in an embodiment, each stripe is assigned to one of the CNodes 132. Each CNode 132 is configured to perform background operations only on data included in its respective assigned stripes. The number of stripes assigned to each of the CNodes 132 may change over time such that the total number of stripes assigned to the CNodes 132 is constant as the number of CNodes 132 in the distributed storage system 130 changes. In a further embodiment, the stripes assigned to each CNode 132 do not overlap with the stripes assigned to each other CNode 132.

In an embodiment, the stripes may be changed as the size of the storage system 130 changes (for example, as disks and DNodes 134 are added or removed). To this end, stripes may be extended when drives are added and shrunk as drives are removed. As a non-limiting example, when a new DNode 134 is added to the storage system when one of the stripes is distributed according to a 4+2 scheme, the stripe may be extended such that its distribution follows a 5+2 scheme. In some implementations, removing a disk may further include checking whether removing the disk will cause the distributed storage system 130 to lack high availability, to read the data from the disk and write it to other disks in the distributed storage system 130, or both.

In another embodiment, an indirection layer may be implemented in non-volatile memory (e.g., in NVRAM) of the DNodes 134. The indirection layer is a portion of such non-volatile memory storing translations between addresses in the metadata and addresses in the underlying data. The indirection layer may be, for example, in the form of an element store as described herein and in the above-referenced patent application Ser. No. 16/002,676, the contents of which are incorporated by reference. The data stored in the DNodes 134 may further include backpointers to locations in the indirection layer. The backpointers may be changed to reflect changes in the indirection layer.

In an embodiment, each CNode 132 is configured as a resiliency module. To this end, each CNode 132 is configured to allocate blocks for its assigned stripe and to store data only in blocks of its allocated stripe.

Each CNode 132 may store, in the DNodes 134, metadata used for storing data and dynamically allocating stripes. The metadata stored by the CNodes 132 may include stripe-related metadata such as, but is not limited to, which stripes it is assigned to, what are the locations (e.g., disk and offset) of blocks allocated to its assigned stripes, statuses of stripes and portions thereof (e.g., open versus committed), stripe sizes, and the like. In an example implementation, such stripe-related metadata may be stored in a non-volatile memory (e.g., NVRAM, not shown) of each CNode 132.

The metadata used for storing data and dynamically allocating stripes may also include disk-related metadata such as, but not limited to, a list of available sub-stripes in each disk, disk statuses, fault domains for disks, disk sizes (e.g., in total numbers of blocks), a number of available blocks in each disk, statuses of available blocks (e.g., reserved, reduce over provisioning, expense of use), and the like. In an example implementation, such disk-related metadata may be stored in a volatile memory (e.g., RAM) of each DNode 134. When a new stripe is assigned to a CNode 132, the disk-related metadata may be updated to add the sub-stripes of the new stripe to the respective lists of available sub-stripes.

In an embodiment, each CNode 132 is also configured to allocate blocks such that, when one of the disks of the DNodes 134 has failed, blocks in the failed disks are not allocated to its assigned stripe. When one of the disks has failed, each CNode 132 may also be configured to recover blocks allocated to its associated stripe that were stored in the failed disk. Each CNode 132 is configured to write the recovered blocks to blocks in other disks that are allocated to the stripe assigned to that CNode 132. Once the recovered data has been written, each CNode 132 is configured to update the elements stored in the DNodes 134 based on the new location of the recovered data.

In some implementations, each stripe may include only data from a specific category. As a non-limiting example, such categories may be cold data (i.e., data that is less frequently modified) and hot data (i.e., data that is more frequently modified). In an example implementation, the category for data may be determined based on an expected frequency of changes and a threshold frequency for hot data. Example techniques for determining expected frequencies of changes of data is described further in U.S. patent application Ser. No. 16/207,732 assigned to the common assignee, the contents of which are hereby incorporated by reference.

In an embodiment, allocation of stripes may further occur with respect to sub-stripes. Each sub-stripe includes a portion of a stripe and is the basic unit for disk recovery such that an entire stripe does not need to be rebuilt when only a portion of the stripe is allocated to one or more failed disks.

A sub-stripe may be allocated when an amount of data equal to the size of the sub-stripe has been written. To this end, in an embodiment, each CNode 132 is configured to accumulate and classify incoming writes. Once a sufficient amount of data having the category of the sub-stripe has been written, the blocks storing that data are allocated to that sub-stripe. The size of each sub-stripe may be changed based on the remaining number of lifecycles for the disk. In a further embodiment, a stripe may be allocated only when there is a sufficient number of sub-stripes to be allocated. This avoids locking out stripes when there are already open stripes for the same category of data.

The example distributed storage system shown in FIG. 1 is described further in U.S. patent application Ser. No. 16/002,676, the contents of which are incorporated by reference.

Figure 4:
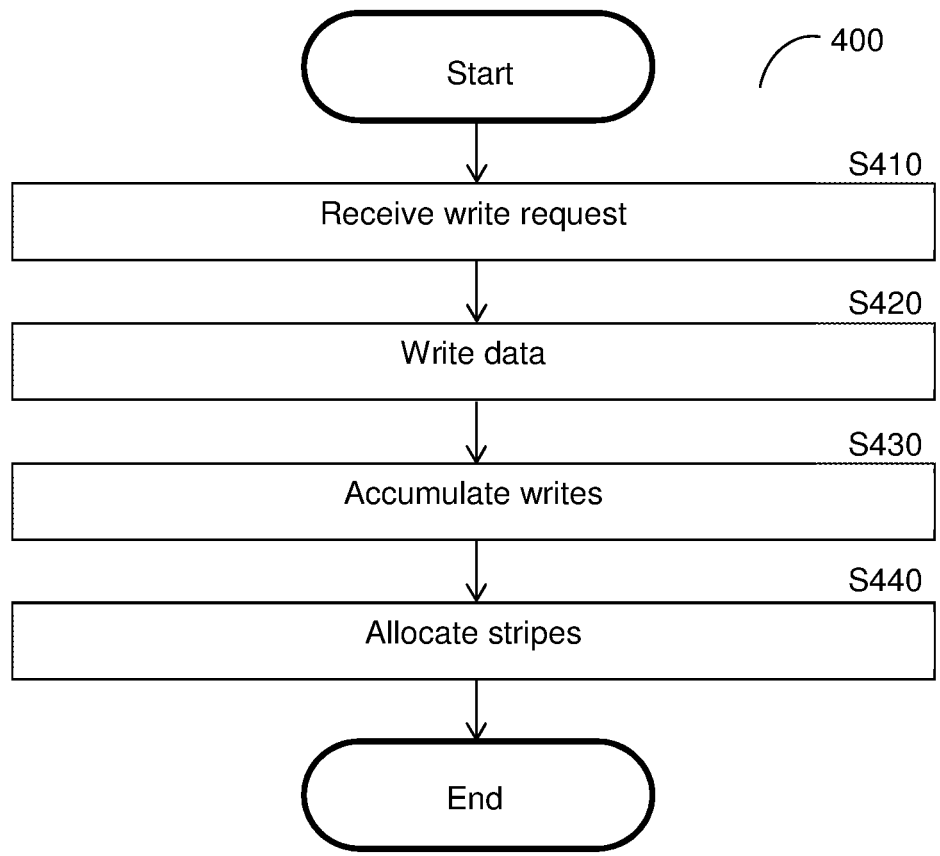
FIG. 4 is an example flowchart illustrating a method for dynamic stripe allocation according to an embodiment.

FIG. 4 is an example flowchart 400 illustrating a method for dynamic stripe allocation according to an embodiment. In an embodiment, the method is performed by one of the CNodes 132, FIG. 1. Each CNode 132 may be configured to perform the method.

At S410, a write request is received. The write request includes data to be written.

At S420, the data is written to a storage node (e.g., one of the DNodes 134). In an embodiment, the data is written to a storage node assigned to the compute node performing the write as described above.

At optional S430, writes are accumulated. The accumulation includes tracking completed writes and, more specifically, the amounts of data stored for each write. Accumulating writes may allow for delaying stripe or sub-stripe allocation until sufficient data to fill a sub-stripe has been written.

In an embodiment, S430 may further include categorizing the data that is written. For example, data may be categorized as hot or cold based on an expected frequency of writes for the data as compared to a hot data threshold. The expected frequency of writes may be determined based on, for example, a type of the data. The categories for the data may be utilized during stripe allocation such that each stripe is allocated to blocks storing the same category of data.

At S440, one or more stripes is allocated to disks among the DNodes. In an embodiment, to provide redundancy, each stripe is allocated among a subset of disks such that no two portions of the same stripe (e.g., two or more sub-stripes) is stored on the same disk.

In an embodiment, S440 includes applying a weighted round robin selection function with respect to blocks in the storage system in order to determine which blocks each stripe should be allocated to. The values of the weights used for the weighted round robin selection are based on factors such as, but not limited to, amount or proportion of free space remaining on disks, remaining lifespan, amount of space needed for recovery, total size of the stripe, combinations thereof, and the like.

In another embodiment, stripes may be allocated via allocation of sub-stripes. To this end, sub-stripes may be allocated to blocks of written data, where each sub-stripe is assigned to a larger stripe. In a further embodiment, allocation of sub-stripes may be delayed until writes having a sufficient total amount of data have been accumulated.

Figure 5:
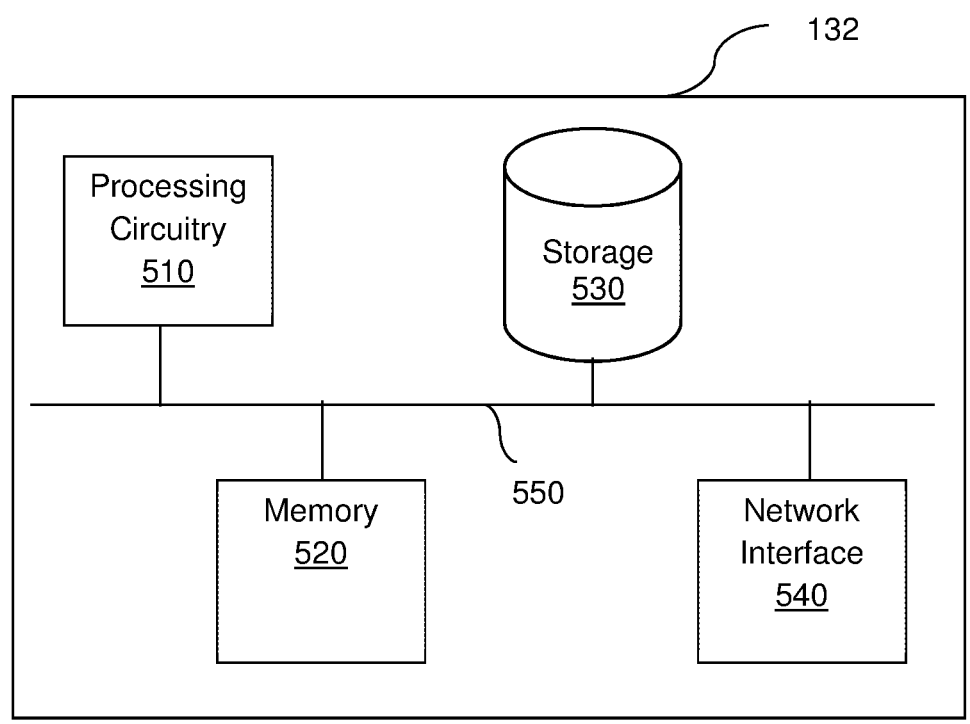
FIG. 5 is a schematic diagram of a compute node according to an embodiment.

FIG. 5 is an example schematic diagram of a CNode 132 according to an embodiment. The CNode 132 includes a processing circuitry 510 coupled to a memory 520, a storage 530, and a network interface 540. In an embodiment, the components of the CNode 132 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, NVRAM, etc.), or a combination thereof. In one configuration, computer readable instructions to implement one or more embodiments disclosed herein may be stored in the storage 530.

In another embodiment, the memory 520 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the CNode 132 to receive access commands and send data over the network 110, FIG. 1.

It should be understood that the embodiments described herein are not limited to the specific architecture illustrated in FIG. 5, and other architectures may be equally used without departing from the scope of the disclosed embodiments.

It should be noted that various embodiments are described with respect to disk failures for simplicity purposes, but the features of the disclosed embodiments related to disk failures may be equally applicable to any component failure that renders a disk inaccessible for storage purposes. For example, failure of a drive containing a disk may also result in failure of the disk, and failure of a storage node including two drives will result in failure of the respective disks contained in the two drives.

It should also be noted that various embodiments are discussed with respect to disks, but that other non-volatile memories capable of storing logically segmented stripes of data may be used in accordance with various disclosed embodiments. In such embodiments, each non-volatile memory may be used as a unit in place of a disk.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A distributed storage system, comprising:
a plurality of storage nodes including a plurality of disks, wherein the plurality of disks includes a plurality of blocks, wherein the plurality of disks is logically segmented into a plurality of stripes, wherein each of the plurality of stripes is dynamically allocated to a portion of the plurality of blocks distributed across a subset of the plurality of disks, wherein the plurality of storage nodes has a plurality of failure domains, each of the plurality of failure domains including at least one of the plurality of disks, wherein each stripe is distributed across a subset of the plurality of disks that includes at most an allowed number of disks within the same failure domain of the plurality of failure domains; and
a plurality of compute nodes, wherein each of the plurality of compute nodes is configured to read data from each of the plurality of storage nodes, wherein each of the plurality of compute nodes is assigned at least one stripe of the plurality of stripes, wherein each of the plurality of compute nodes is configured to write data to each stripe assigned to the compute node, wherein the plurality of compute nodes is further configured to dynamically determine the allowed number of disks within the same failure domain of the plurality of failure domains based on a number of the plurality of failure domains that are available at a time of the determination.

2. The distributed storage system of claim 1, wherein the plurality of storage nodes further includes a plurality of drives, wherein the allowed number of disks for each stripe is changed based on a number of the plurality of drives, an amount of free space in the storage nodes, and a number of the plurality of failure domains that are currently available.

3. The distributed storage system of claim 1, wherein each stripe is allocated using a weighted round robin block selection, wherein the weighted round robin block selection includes applying a weighted round robin function including at least one weight, wherein a value of each of the at least one weight is based on at least one of: a remaining lifespan of each of the plurality of disks, an amount of space needed for recovery, and a total size of each of the plurality of stripes.

4. The distributed storage system of claim 1, wherein each of the plurality of stripes is allocated based on a proportion of free space available on each of the plurality of disks.

5. The distributed storage system of claim 1, wherein each of the plurality of stripes is allocated dynamically when data is stored in the distributed storage system.

6. The distributed storage system of claim 1, wherein a size of each of the plurality of stripes is limited based on a total number of the plurality of disks and an allowable number of failed disks.

7. The distributed storage system of claim 1, wherein each of the plurality of stripes includes a plurality of sub-stripes, wherein each sub-stripe is allocated to at least one of the plurality of blocks, wherein each sub-stripe is allocated when at least a threshold amount of data has been written to the distributed storage system.

8. The distributed storage system of claim 1, wherein each of the plurality of compute nodes is configured to perform a degraded read when a read error has occurred during an attempt to read a failed disk of the plurality of disks, wherein the degraded read includes rebuilding a portion of each stripe that is allocated to data in the failed disk, wherein the rebuilt data is stored in at least one functioning disk of the plurality of disks.

9. The distributed storage system of claim 1, wherein each of the plurality of compute nodes is configured to extend at least one of the plurality of stripes when a new storage node is added to the plurality of storage nodes.

10. The distributed storage system of claim 1, wherein each of the plurality of compute nodes is configured to shrink at least one of the plurality of stripes when one of the plurality of storage nodes is at least one of: failed, and removed.

11. The distributed storage system of claim 1, wherein each of the plurality of stripes has a size, wherein at least some of the plurality of stripes have different sizes.

12. The distributed storage system of claim 1, wherein each storage node includes at least one drive, wherein each drive includes one of the plurality of disks.

13. The distributed storage system of claim 1, wherein each of the plurality of compute nodes is configured to rebuild a first stripe of the at least one stripe assigned to the compute node when at least one of the portion of the plurality of blocks to which the stripe is allocated is unavailable, wherein rebuilding the first stripe includes determining a portion of one of the plurality of disks that is unallocated, wherein the rebuilt first stripe includes the determined unallocated portion.

14. A method for providing resiliency in distributed storage systems, comprising:
allocating, by a first compute node of a plurality of compute nodes, at least one first stripe of a plurality of stripes, wherein the plurality of stripes is distributed among a plurality of storage nodes including a plurality of disks, wherein the plurality of disks includes a plurality of blocks, wherein the plurality of disks is logically segmented into the plurality of stripes, wherein each of the plurality of stripes is dynamically allocated to a portion of the plurality of blocks distributed across a subset of the plurality of disks, wherein each of the plurality of compute nodes is configured to read data from each of the plurality of storage nodes, wherein the first compute node is assigned to the at least one first stripe, wherein the first compute node is configured to write data to the at least one first stripe, wherein the plurality of storage nodes has a plurality of failure domains, each of the plurality of failure domains including at least one of the plurality of disks, wherein each stripe is distributed across a subset of the plurality of disks that includes at most an allowed number of disks within the same failure domain of the plurality of failure domains, wherein the plurality of compute nodes is further configured to dynamically determine the allowed number of disks within the same failure domain of the plurality of failure domains based on a number of the plurality of failure domains that are available at a time of the determination.

15. The method of claim 14, wherein the plurality of storage nodes further includes a plurality of drives, wherein the allowed number of disks for each stripe is changed based on a number of the plurality of drives, an amount of free space in the storage nodes, and a number of the plurality of failure domains that are currently available.

16. The method of claim 14, wherein the first stripe is allocated using a weighted round robin block selection, wherein the weighted round robin block selection includes applying a weighted round robin function including at least one weight, wherein a value of each of the at least one weight is based on at least one of: a remaining lifespan of each of the plurality of disks, an amount of space needed for recovery, and a total size of each of the plurality of stripes.

17. The method of claim 14, wherein the first stripe is allocated based on a proportion of free space available on each of the plurality of disks.

18. The method of claim 14, wherein the first stripe is allocated dynamically when data is stored in the plurality of storage nodes.

19. The method of claim 14, wherein a size of the first stripe is limited based on a total number of the plurality of disks and an allowable number of failed disks.

20. The method of claim 14, wherein the first stripe includes a plurality of sub-stripes, wherein each sub-stripe is allocated to at least one of the plurality of blocks, wherein each sub-stripe is allocated when at least a threshold amount of data has been written to the plurality of storage nodes.

21. The method of claim 14, wherein the first compute node is configured to perform a degraded read when a read error has occurred during an attempt to read a failed disk of the plurality of disks, wherein the degraded read includes rebuilding a portion of each of the at least one first stripe that is allocated to data in the failed disk, wherein the rebuilt data is stored in at least one functioning disk of the plurality of disks.

22. The method of claim 14, wherein the first compute node is configured to extend at least one of the at least one first stripe when a new storage node is added to the plurality of storage nodes.

23. The method of claim 14, wherein the first compute node is configured to shrink at least one of the at least one first stripe when one of the plurality of storage nodes is at least one of: failed, and removed.

24. The method of claim 14, wherein each of the plurality of stripes has a size, wherein at least some of the plurality of stripes have different sizes.

25. The method of claim 14, wherein each storage node includes at least one drive, wherein each drive includes one of the plurality of disks.

26. The method of claim 14, wherein the first compute node is configured to rebuild a second stripe of the at least one first stripe when at least one of the portion of the plurality of blocks to which the second stripe is allocated is unavailable, wherein rebuilding the second stripe includes determining a portion of one of the plurality of disks that is unallocated, wherein the rebuilt second stripe includes the determined unallocated portion.

27. A non-transitory computer readable medium having stored thereon instructions for causing a processing circuitry to execute a process, the process comprising:
allocating at least one first stripe of a plurality of stripes, wherein the plurality of stripes is distributed among a plurality of storage nodes including a plurality of disks, wherein the plurality of disks includes a plurality of blocks, wherein the plurality of disks is logically segmented into the plurality of stripes, wherein each of the plurality of stripes is dynamically allocated to a portion of the plurality of blocks distributed across a subset of the plurality of disks, wherein each of a plurality of compute nodes is configured to read data from each of the plurality of storage nodes, wherein each of the plurality of compute nodes is assigned at least one stripe of the plurality of stripes, wherein each of the plurality of compute nodes is configured to write data to each stripe assigned to the compute node, wherein the plurality of storage nodes has a plurality of failure domains, each of the plurality of failure domains including at least one of the plurality of disks, wherein each stripe is distributed across a subset of the plurality of disks that includes at most an allowed number of disks within the same failure domain of the plurality of failure domains, wherein the plurality of compute nodes is further configured to dynamically determine the allowed number of disks within the same failure domain of the plurality of failure domains based on a number of the plurality of failure domains that are available at a time of the determination.

* * * * *